(12) United States Patent
Stefanko

(10) Patent No.: US 7,509,749 B1
(45) Date of Patent: Mar. 31, 2009

(54) WAVE CONFIGURATION FOR THE WEB OF A LEVEL FRAME

(75) Inventor: John M. Stefanko, Brookfield, WI (US)

(73) Assignee: Johnson Level & Tool Mfg. Co., Inc., Mequon, WI (US)

( * ) Notice: Subject to any disclaimer, the term of this patent is extended or adjusted under 35 U.S.C. 154(b) by 141 days.

(21) Appl. No.: 11/552,639

(22) Filed: Oct. 25, 2006

(51) Int. Cl.
*B43L 13/20* (2006.01)

(52) U.S. Cl. .............................. 33/451; 33/300; 33/383; D10/69

(58) Field of Classification Search .................. 33/451, 33/300, 340, 341, 343, 373, 377, 379, 383, 33/384, 415, 365, 366.11–366.27; D10/67, D10/69, 74
See application file for complete search history.

(56) References Cited

U.S. PATENT DOCUMENTS

| | | | | |
|---|---|---|---|---|
| D25,392 S | * | 4/1896 | Starrett | D10/69 |
| 764,556 A | * | 7/1904 | Gable | 33/381 |
| 783,897 A | * | 2/1905 | Sanger | 33/290 |
| 1,182,730 A | * | 5/1916 | Anderson et al. | 33/376 |
| 1,829,257 A | * | 10/1931 | Best et al. | 33/383 |
| D146,342 S | * | 2/1947 | White | D10/62 |
| D157,855 S | * | 3/1950 | Fluke | D10/69 |
| 2,507,073 A | * | 5/1950 | White | 177/251 |
| 2,559,961 A | * | 7/1951 | Howell | 33/374 |
| 3,545,091 A | * | 12/1970 | Sebastiani | 33/372 |
| D315,521 S | * | 3/1991 | Greenland | D10/69 |
| 6,836,973 B1 | * | 1/2005 | Eccles, Jr. | 33/374 |
| D503,349 S | * | 3/2005 | Webb | D10/69 |
| D559,713 S | * | 1/2008 | Stefanko | D10/74 |

* cited by examiner

*Primary Examiner*—G. Bradley Bennett
*Assistant Examiner*—Tania C Courson
(74) *Attorney, Agent, or Firm*—Boyle Fredrickson, S.C.

(57) ABSTRACT

A molded plastic yet structurally rigid tool, such as a level, with a web extending in a generally undulating configuration. The undulating configuration of the web acts to strengthen and make the level more rigid when compared to a level with a planar web. The undulating configuration of the web is substantially symmetrical about the centerline of the level over its entire length, but may also be arranged in a number of non-planar embodiments.

17 Claims, 5 Drawing Sheets

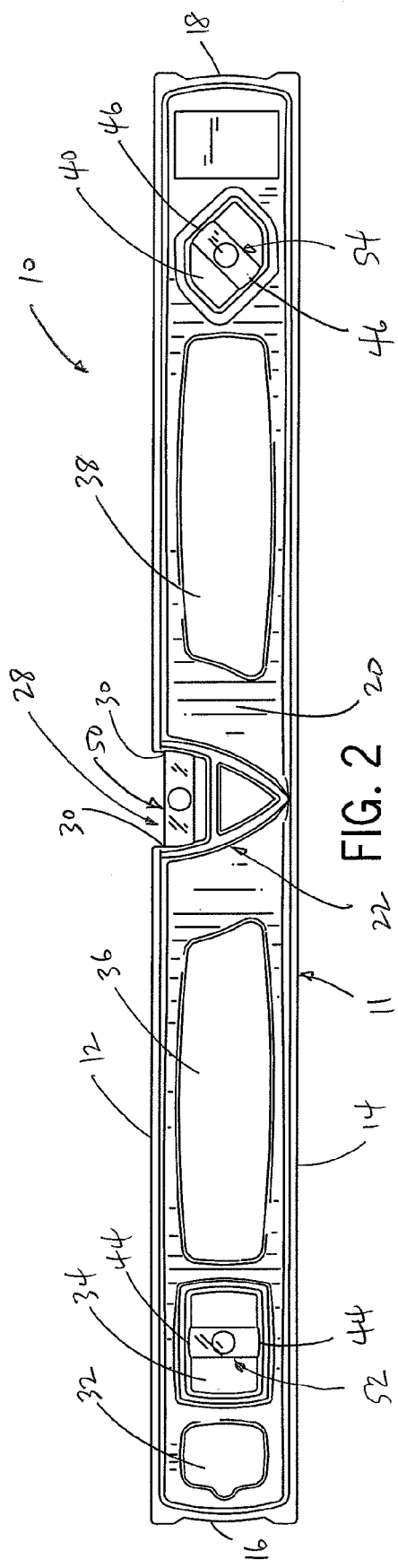

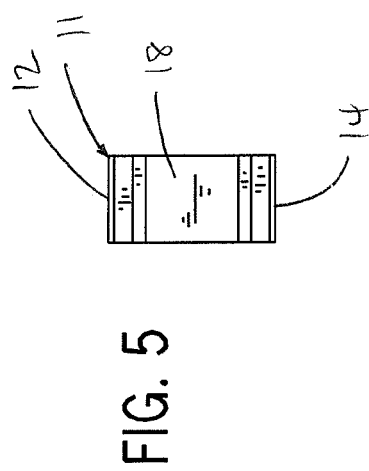
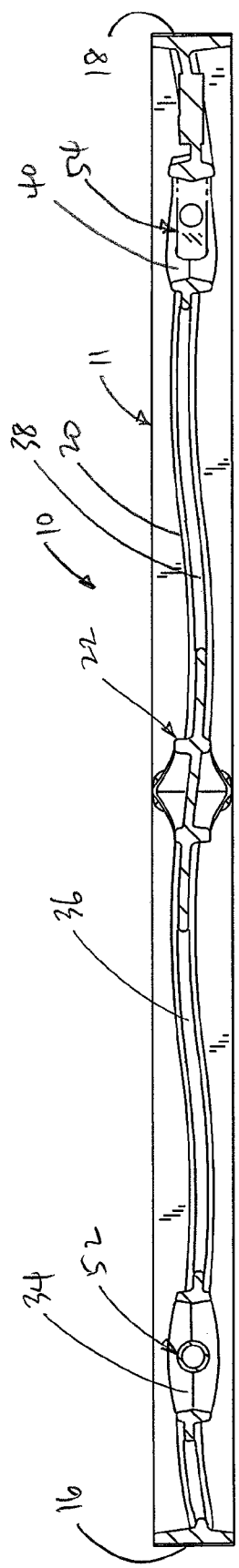

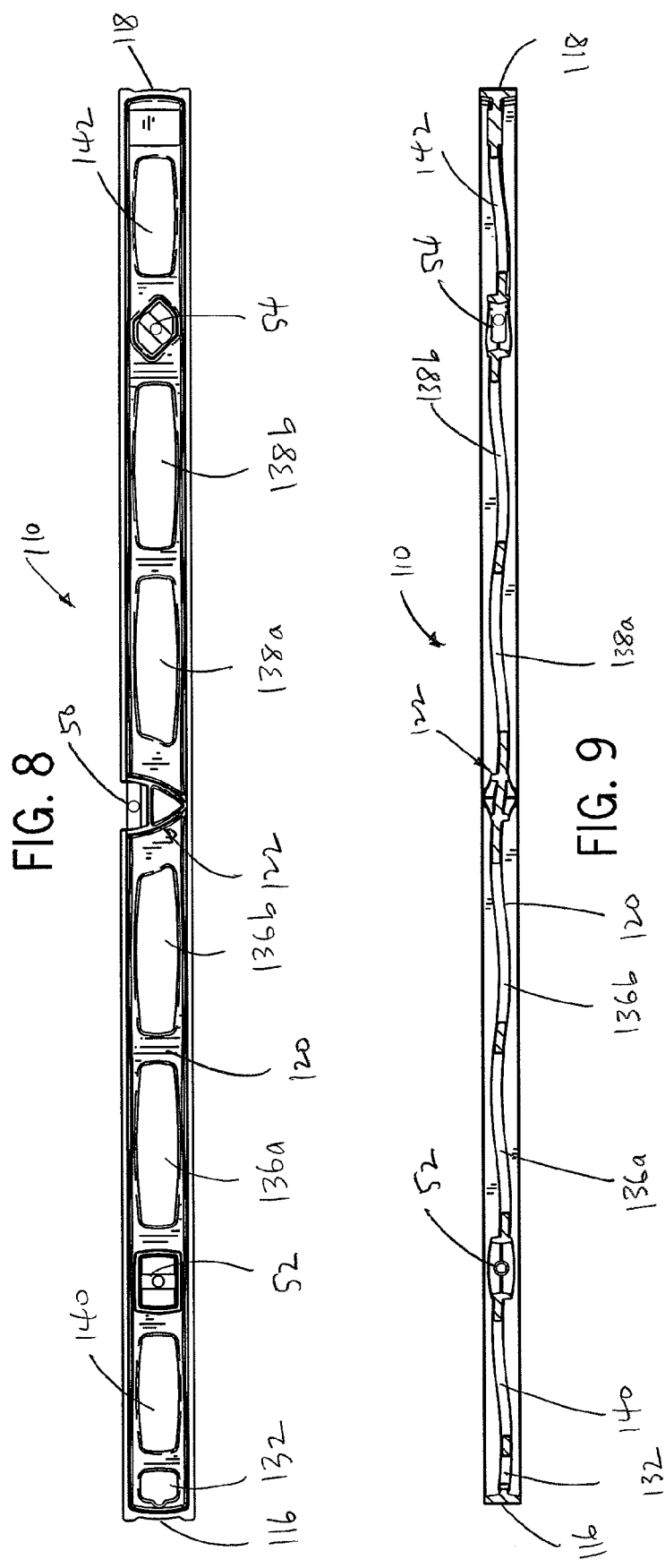

US 7,509,749 B1

WAVE CONFIGURATION FOR THE WEB OF A LEVEL FRAME

FIELD OF THE INVENTION

The present invention relates to a level, and more specifically to a web configuration for a level.

BACKGROUND OF THE INVENTION

Leveling and/or plumbing devices, generally referred to as levels, are frequently used in construction or other applications for marking or determining the level or plumb orientation of an object or surface. In many cases, levels are constructed of a material such as wood or metal. To reduce manufacturing costs, and/or to reduce weight, it is also known to construct levels using a moldable material such as fiberglass or plastic. A typical molded level includes a rectangular frame defining a pair of spaced flanges that form the gauging surfaces of the level, a pair of opposing end walls, and a web that interconnects the flanges and end walls. The web is formed with a number of openings within which the measuring or "bubble" vials of the level are mounted. The web may also include openings that act as hand holes to facilitate handling of the level, or for use in hanging the level for storage or transport. Each vial opening may include an opposed pair of notches, slots or recesses, for receiving and securing the ends of one of the vials.

Molded frame levels are generally light weight and durable, and typically provide a high degree of accuracy. However, molded levels may not have the structural rigidity found in a metal or wood level due to the inherent strength limitations of the molded material. For this reason, a molded level may flex or twist slightly in response to forces exerted on the frame. This deficiency can be addressed by increasing the web thickness. However, this solution increases the amount of material required to mold the web, thereby increasing the weight and cost of manufacture of the level.

In view of the foregoing, it is desirable to provide a molded frame level that minimizes the flexing and twisting that can occur when the level frame is subjected to pressure and force, while maintaining the low cost of manufacture of the level.

SUMMARY OF THE INVENTION

It is an object of the present invention to provide a level formed of a moldable material, such as plastic, that is structurally rigid without substantially increasing the amount of material used in its construction. The invention, which is defined by the claims set out at the end of this disclosure, is intended to solve at least some of the problems noted above. In one embodiment, a level is provided with a frame that has an undulating or wave-shaped web over at least a portion of the length of the level frame. The undulating or wave configuration of the web adds strength and rigidity to the level frame when compared to a typical level frame with a planar web. This configuration substantially reduces flexing of the level when the level is subjected to lateral or twisting forces. The web can be designed with any type of undulating or wave configuration including, without limitation, a sinusoidal, triangle or square wave configuration.

Various other features, objects and advantages of the invention will be made apparent from the following detailed description taken together with the drawings.

BRIEF DESCRIPTION OF THE DRAWINGS

Preferred exemplary embodiments of the invention are illustrated in the accompanying drawings, in which like reference numerals represent like parts throughout and in which:

FIG. 2 is a side elevation view of the level of FIG. 1;

FIG. 3 is a top plan view of the level of FIG. 1;

FIG. 4 is a bottom plan view of the level of FIG. 1;

FIG. 5 is an end elevation view of one end of the level of FIG. 1;

FIG. 6 is a sectional view taken along line 6-6 of FIG. 1;

FIG. 8 is a side elevation view of the level of FIG. 7; and

FIG. 9 is a sectional view taken along line 9-9 of FIG. 7

DETAILED DESCRIPTION OF THE INVENTION

Figure 1:
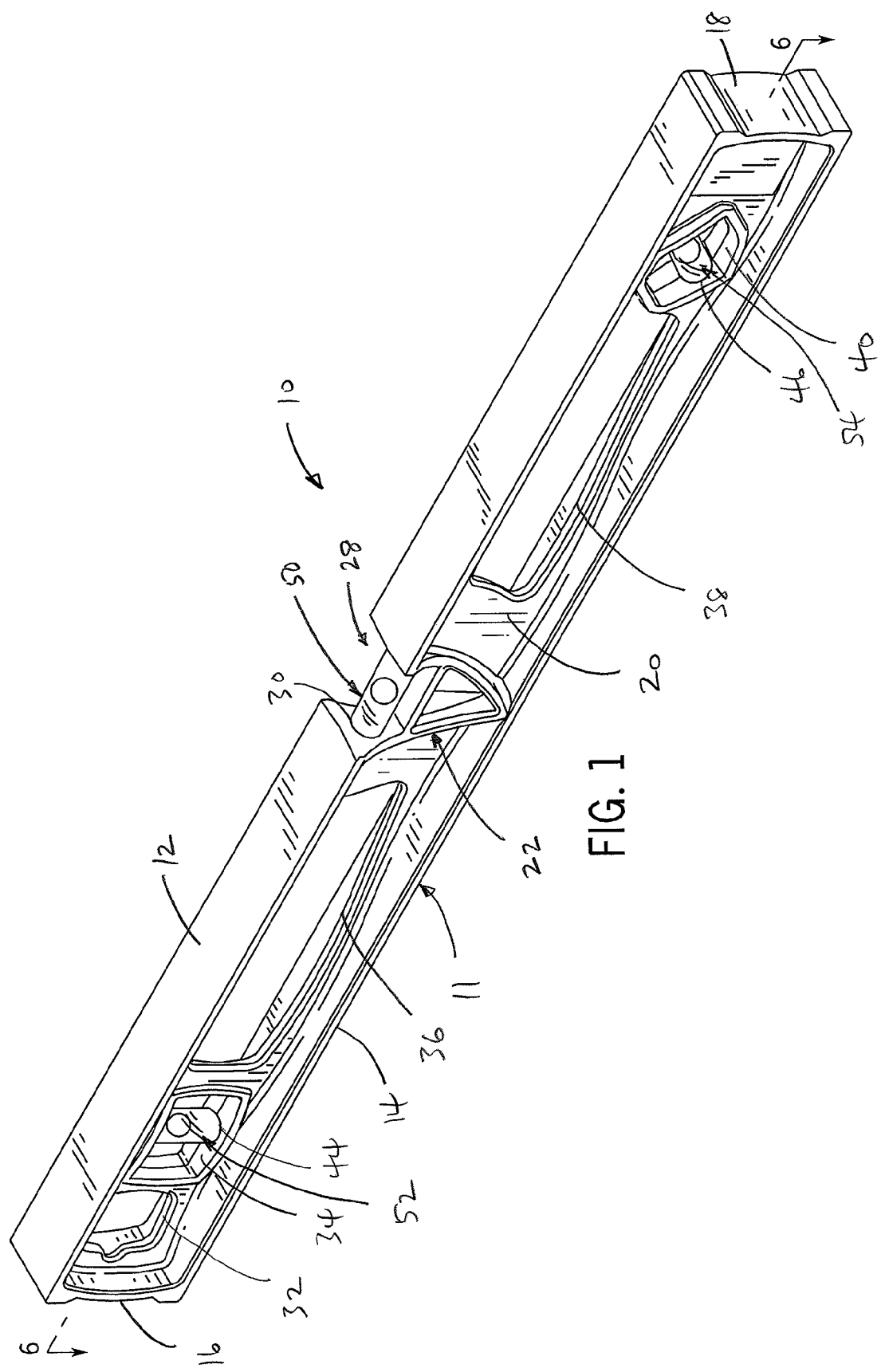
FIG. 1 is an isometric view of a first embodiment of a level incorporating a web constructed in accordance with the present invention.

Before explaining embodiments of the invention in detail, it is to be understood that the invention is not limited in its application to the details of construction and the arrangement of the components set forth in the following description or illustrated in the drawings. The invention is capable of other embodiments, and may be pracited or carried out in various ways. Also, it is to be understood that the phraseology and terminology employed herein is for the purpose of description and should not be regarded as limiting.

FIGS. 1-6 show a first embodiment of a tool, such as a level 10, made in accordance with the invention. The level 10 includes a frame that is formed of an integral piece of molded material such as plastic or fiberglass, although it is understood that the level 10 may be formed of any other satisfactory material. The level 10 includes a frame 11 having a planar top flange 12 and a planar bottom flange 14, which extend parallel to each other between a pair of opposed end walls 16, 18. A web 20 extends between and interconnects the flanges 12, 14 and end walls 16, 18.

The level 10 has a generally I-shaped cross section. A curved V-shaped center reinforcement 22 is formed within the level 10. The center reinforcement 22 creates a gap 28 in the upper flange 12 and in the web 20. The center reinforcement 22 includes slots or recesses 30 which are configured to receive and engage the ends of a bubble vial 50, in a manner as is known.

As shown in FIGS. 1-2, the web 20 is formed with a series of apertures 32, 34, 36, 38, 40, the number and configuration of which can vary as desired, and in accordance with the length of the level 10. Two of the apertures 34, 40 have slots 44, 46, respectively, that are configured to receive and engage the ends of additional bubble vials 52, 54, respectively. In the illustrated embodiment, the slots 44 in aperture 34 are oriented to receive the ends of a bubble vial 52 positioned to extend perpendicular to the longitudinal axis of the level 10, which is used in a plumbing application, i.e. to gauge the orientation of a surface relative to vertical. The slots 46 in aperture 40 are oriented to receive the ends of a bubble vial 54 positioned at an angle of forty five degrees to the longitudinal axis of the level 10, which is used to gauge the orientation of a surface relative to an angle of forty five degrees between horizontal and vertical. The larger apertures 36, 38 can be used for carrying the level 10 while the smaller aperture 32 can be used to hang the level 10 when not in use.

The end walls 16, 18 of level 10 extend between and interconnect flanges 12, 14. The end walls 16, 18 have a width generally equal to that of flanges 12 and 14, and are integrally formed with flanges 12, 14 and web 20.

In accordance with the present invention, the web 20 has a non-planar configuration. FIGS. 1 and 6 show the web 20 extending from one end wall 16 to the other end wall 18 in an undulating or generally wave-shaped configuration. In the illustrated embodiment, the web 20 is substantially symmetrical about the longitudinal centerline of the level 10 over its length, although it is understood that an asymmetrical configuration may be employed. With the undulating or wave-shaped configuration, the web 20 provides an increased stiffness to the level 10 over that which is possible with a generally planar web of comparable thickness.

Figure 7:
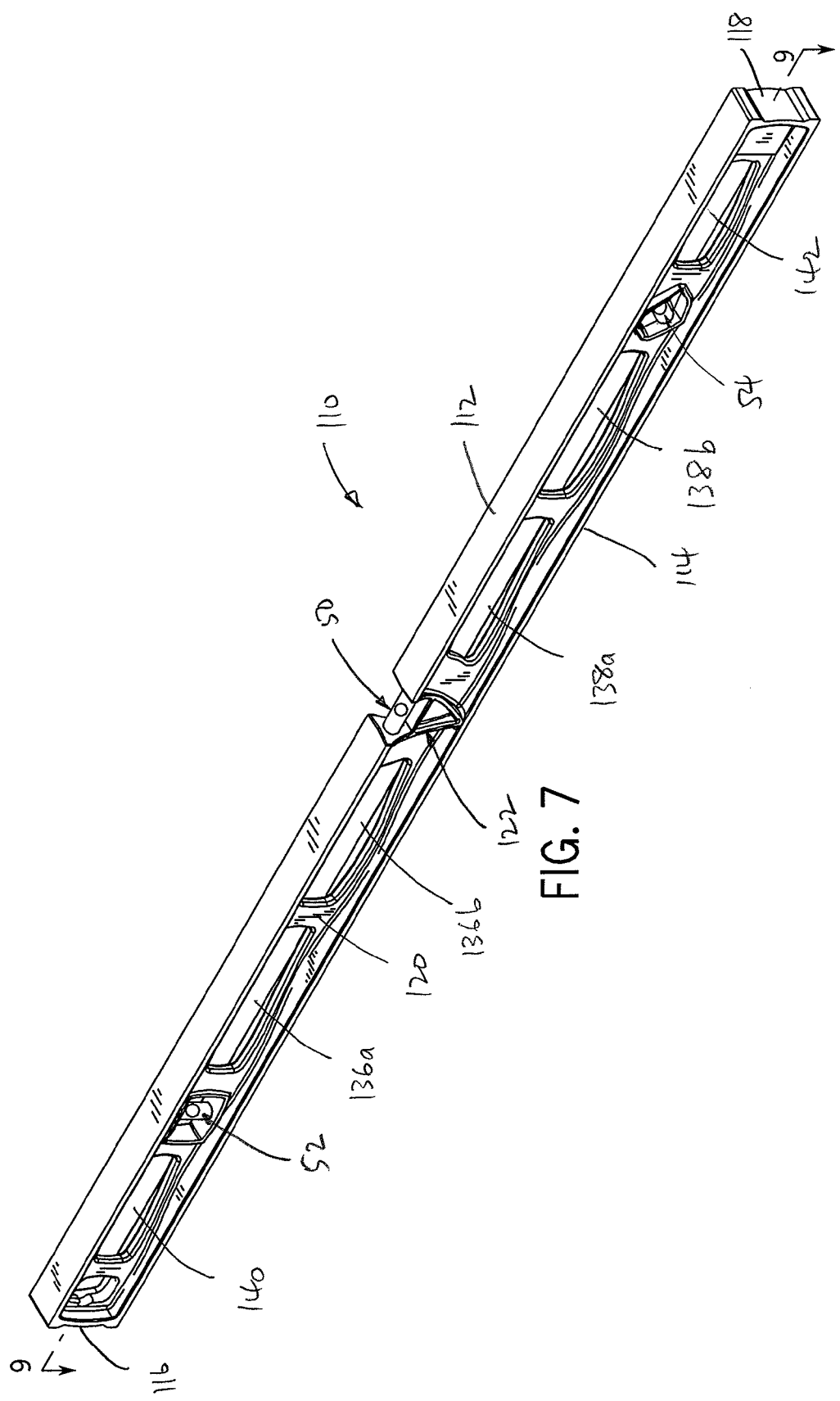
FIG. 7 is an isometric view of a second embodiment of a level incorporating a web constructed in accordance with the present invention.

FIGS. 7-9 show a second embodiment of a tool, such as a level 110, made in accordance with the present invention. Similar reference characters (increased by 100) are used in FIGS. 7-9 as in FIGS. 1-6 to denote similar components and features. The level 110 of this embodiment is longer than the level 10 of FIGS. 1-6. Because of the increased length of the level 110, the web 120 can have additional apertures without decreasing the strength of the level 110. Representatively, apertures 136a and 136b may be located between vials 50 and 52, and apertures 138a and 138b may be located between vials 50 and 54. An additional aperture 140 may be located between vial 52 and end wall 116, and an additional aperture 142 may be located between vial 54 and end wall 118.

While the present invention has been shown and described with respect to specific embodiments, it is understood that various alternative and modifications are possible and are contemplated a being within the scope of the present invention. For example, and without limitation, the wave-shaped configuration of the web 20 could extend over only a portion of the length of the level 10, with the remaining portion of the web 20 being generally planar. Alternatively, the web 20 could be comprised of angled linear portions. Also, the web 20 could be comprised of parallel offset web sections on opposite sides of the center of the level 10. The length of the undulating portions of the web 20 may be uniform throughout the length of the level 10, or the undulating portions of the web 20 may vary in length. The length of the undulating portions, or the "frequency" of repetition of the undulating portions, may vary from the relatively long length as shown in the drawings to a relatively short length in which the undulations in the web 20 repeat many times over the length of the level 10. While the level 10 has been shown and described as having bubble vials for the indicating the orientation of the level gauging surfaces, it is understood that any other types of orientation indicating members or components may be used, e.g. digital indicators or the like. In addition, while it is contemplated that the frame 11 of level 10 may be formed integrally of a moldable material in an injection molding process, it is also understood that the frame 11 of the level 10 may be formed of several pieces that are connected together. As an example, the web 20 may be formed of a metal material in a stamping operation, and the flanges 12, 14 may be connected to the edges of the web 20, e.g. via welding.

Various alternatives are contemplated as being within the scope of the following claims particularly pointing out and distinctly claiming the subject matter regarded as the invention.

I claim:

1. A level tool, comprising:
    a frame extending along a rigid longitudinal axis and defining at least one gauging surface and a web, wherein the web defines opposed first and second faces and a gauging surface, wherein the gauging surface lies in a first plane and is adapted for placement on a worksurface;
    one or more will orientation indicating members carried by the frame for indicating an orientation of the worksurface when the gauging is place on the worksurface;
    wherein the web extends from the gauging surface and is oriented at an angle relative to the first plane, wherein the web has a non-planar configuration in a direction along the longitudinal axis, and wherein the first and second faces of the web extend relative to the first plane at the same angle.

2. The tool of claim 1, wherein the tool comprises a level.

3. The tool of claim 2, wherein the web has one or more apertures.

4. The tool of claim 3, wherein the one or more level indicating members include at least one vial located within one of the apertures.

5. The tool of claim 4, wherein the web includes a reinforcement structure at one of the apertures.

6. The tool of claim 5, wherein the reinforcement structure defines a gap within which a vial is located.

7. The tool of claim 3, wherein the frame is constructed of a plastic material in a molding operation.

8. A level, comprising:
    a frame defined by a top flange and a bottom flange, wherein the top and bottom flanges define top and bottom gauging surfaces adapted for placement on a worksurface, wherein the top and bottom gauging surfaces lie in parallel planes, and extend between opposing ends defined by the frame, wherein the frame further includes a web that extends between and interconnects the flanges,
    one or more will orientation indicating members carried by the frame for indicating an orientation of the work surface when one of the gauging surfaces is place on the worksurface;
    wherein the web defines opposed first and second faces and extends along a rigid longitudinal axis defined by the frame in a non-planar configuration, and wherein the opposed first and second faces of the web are oriented at the same angle relative to the gauging surfaces.

9. The level of claim 8, wherein the web has an undulating configuration.

10. The level of claim 9, wherein the undulating configuration comprises a series of arcuate sections.

11. The level of claim 9, wherein the web has a plurality of apertures.

12. The level of claim 11, wherein the plurality of apertures define spaces for receiving leveling vials.

13. The level of claim 12, wherein the level is constructed of a molded plastic material.

14. A method of making a level-type tool, comprising:
    forming a frame with a web and at least one gauging surface adapted for placement on a worksurface, wherein the frame extends along a rigid longitudinal axis, and wherein the gauging surface lies in a first plane, wherein the web is formed so as to have opposed first and second faces and with a non-planar configuration in a direction along the longitudinal axis and such that the opposed first and second faces are oriented at the same angle relative to the first plane; and securing one or more orientation indicating members to the frame.

15. The method of claim 14, wherein the act of forming the frame is carried out by molding the frame of a plastic material.

16. The method of claim 14, wherein the act of securing one or more orientation indicating members to the frame is carried out by securing one or more vials within one or more openings defined by the web of the frame.

17. The method of claim 16, wherein the act of forming the web with a non-planar configuration is carried out by forming the web of repetition non-parallel web sections.

* * * * *